July 30, 1957 P. R. GROSSMAN ET AL 2,801,158
METHOD OF AND APPARATUS FOR GASIFICATION OF PULVERIZED COAL
Filed May 9, 1951

INVENTORS
Paul R. Grossman
Theodore S. Sprague
BY
*J. P. Moran*
ATTORNEY

United States Patent Office 2,801,158
Patented July 30, 1957

2,801,158

METHOD OF AND APPARATUS FOR GASIFICATION OF PULVERIZED COAL

Paul R. Grossman, Alliance, Ohio, and Theodore S. Sprague, Hewlett, N. Y., assignors to The Babcock & Wilcox Company, Rockleigh, N. J., a corporation of New Jersey Application May 9, 1951, Serial No. 225,346

16 Claims. (Cl. 48—78)

This invention relates to the production of synthesis gas by the partial combustion of pulverized coal in the presence of oxygen and steam to produce a gas comprising essentially $CO+H_2$, this process being frequently referred to as the complete gasification of coal as distinguished from partial gasification thereof to extract volatile matter leaving residual carbon. The present invention relates to an improved method of and apparatus for effecting such synthesis gas reaction.

The reaction of the pulverized coal with steam and $CO_2$ is endothermic in nature, thus requiring a net heat input to raise the temperature of the reactants to the reaction temperature range. This temperature increase may be effected by an exothermic reaction involving partial combustion of the coal utilizing a quantity of oxygen insufficient for complete combustion.

The most effective temperature range for the endothermic reaction is in excess of 2000° F. The combustion temperature must be substantially above this range to insure that enough sensible heat be imparted to the reactants to maintain the temperature in the range during which gasification progresses rapidly. This will be clear if it is considered that the travel time of the reactants before the reaction is completed must be sufficiently long for the reactants to reach or exceed the reaction temperature range plus an additional travel time of sufficient length to complete the endothermic reaction.

These relatively high required temperatures, plus the necessity of maintaining the heat losses at a minimum, indicate that the combustion and reaction apparatus should be refractory lined. The shape and dimensions of the apparatus are established by considerations of the desired throughput of coal, required reactant travel path length, and establishment of the necessary relative velocities of the reactants.

For the greatest efficiency of the exothermic reaction and for thorough admixture of the reactants, a high degree of turbulence is required. However, such turbulence often results in a recirculation of gases, and such recirculation detracts from the efficiency of the conversion of the reactants into the synthesis gas.

As the most effective temperatures for the gas making reactions are above the ash fusion points of most coals, slag is formed on the sides and bottom of the combustion and reaction chamber. The slag running down the sides or walls of the chamber interferes with the operation of the burners. The slag not only tends to erode the refractory lining but also requires that measures be taken to dispose of the slag. This latter has been effected, previously, during periodic shut-downs when the slag accumulation has become excessive.

However, such shut-downs for slag removal have been disadvantageous in that the combustion and reaction zone has had to be cooled, resulting in a low availability of the apparatus and resultant increased cost.

Normal slag withdrawal arrangements, wherein the slag is bottom tapped, while still molten, into a water well, cannot be used as the endothermic nature of the process often interferes with the maintenance of a temperature adjacent the slag outlet above the slag fusion temperature. Consequently, it has been proposed to provide auxiliary heating arrangements adjacent the slag outlet to maintain the slag molten. These additional heating arrangements represent an additional item of expense which detracts from the overall economy of the gasification process.

In accordance with the present invention, the foregoing difficulties are avoided by carrying out the synthesis gas reaction in two stages or zones separated by an intermediate or transition zone forming a high velocity barrier inhibiting recirculation of gases from the secondary zone to the primary zone. The incomplete combustion of the coal particles, with substantially pure oxygen and in the presence of at least some steam, is effected in an initial preponderantly exothermic reaction stage, or combustion zone having a slag outlet. In this stage, the turbulent conditions, conducive to the greatest efficiency of the exothermic reaction, thorough admixture of the reactants, and the development of a temperature level at least equal to the most effective reaction temperature range and above the slag fusion temperatures, are produced by delivering one or more streams of pre-mixed pulverized coal, oxygen and steam to the combustion zone in such manner as to maintain a rate of combustion sufficient to maintain a temperature level, adjacent the slag outlet, above the slag fusion temperature. The steam serves to control the combustion zone temperatures.

The combustion zone has a restricted throat gas outlet forming a transition zone between the primary and secondary zones. As the stream of gaseous products of combustion and any unburned carbon particles, heated to a temperature above the reaction range, flows toward this restricted throat, the additional part of the steam requirements is introduced thereinto for thorough and intimate admixture with the highly heated reactants. This throat has the function of facilitating thorough admixing of the reactants flowing therethrough and substantially accelerating the gas flow to provide a high velocity barrier inhibiting recirculation of gases from the secondary zone to the primary zone. The gas stream leaving the throat flows through the secondary zone during which the endothermic reaction to produce the synthesis gas is completed. Preferably, the restricted throat is followed by an expansion section to prevent eddy currents in the secondary zone and thus prevent recirculation of fully reacted gas into the stream issuing from the throat. While such splitting of the steam requirements is preferred to facilitate slag tapping, under certain circumstances it may be advisable to introduce all of the steam requirements in pre-mixed relation with the oxygen and pulverized coal.

Thus, the preponderantly exothermic and the preponderantly endothermic stages are effectively separated by the high velocity barrier provided by the transition zone so that the most efficient temperature level raising and slag disposal conditions may be maintained in the primary or combustion zone and the most efficient reaction temperatures maintained in the secondary or reaction zone.

The fuel is ignited and incompletely burned in the combustion zone while in suspension in a fluid stream directed toward the slag outlet, whereby a rate of fuel combustion is maintained sufficient to hold the normal mean temperature in the zone adjacent the slag outlet at a value above the slag fusion temperature. Maintenance of such normal mean temperature is greatly facilitated by the fact that only a portion of the steam requirements may be introduced with the oxygen and fuel, thereby correspondingly reducing the heat extraction effects resulting from admixture of all of the steam requirements with the fuel stream.

The fuel ash is continuously withdrawn as a molten slag, being disposed of by discharge into a sealed water tank, for example. Meanwhile, the stream of gaseous products of combustion and any unburned fuel particles is withdrawn through the restricted gas outlet or transition zone, with the remaining reaction steam requirements being supplied to the stream of reactants, in intimate mixing relation therewith, in advance of the restricted gas outlet. The intimate admixing of the remaining reaction steam with the reactants is facilitated by passage of the mixture through the restricted gas outlet. The synthesis gas reaction is completed in the secondary reaction zone receiving the mixture from the restricted throat of the primary zone.

In a preferred form of apparatus for effecting the invention process, the primary reaction chamber is an upright cylinder having a refractory interior lining and an axially disposed bottom slag outlet. The top of the cylinder comprises a substantially frusto-conical roof or arch defining the entrance to the restricted gas outlet. This arch is a composite structure serving also as the base or floor for the secondary reaction chamber which is also an upright, refractory lined cylinder co-axial with the primary reaction chamber.

The bottom slag outlet communicates with a well or the like, containing water or other coolant, and having a pressure sealed overflow. The axial outlet of the secondary chamber communicates with a synthesis gas withdrawal duct having heat absorbing elements therein for cooling of the reaction gas.

The burners for introducing the oxygen-steam-coal stream are preferably arranged, in circumferentially spaced relation, to extend through the conical roof of the primary reaction chamber. The roof acts as an umbrella for the burners, preventing slag running down the walls from interfering with the burners. The burners are so arranged that the fuel streams do not impinge upon the chamber walls. To this end, they may preferably be directed somewhat tangentially of the primary chamber and downwardly toward the slag outlet. This results in a hot flame sweeping over the area adjacent the slag outlet to assist in maintaining a local zone of high temperature adjacent the slag outlet, such temperature being above the slag fusion temperature. Other burner arrangements may be used to provide such local high temperature range. For example, the lower end of the primary chamber may be mushroomed out with the burners directed downwardly onto the slag covered chamber floor for redirection upwardly toward the gas outlet.

The remainder of the reaction steam requirements is preferably introduced through circumferentially spaced ports arranged circumferentially intermediate the burners at a zone in advance of the gas outlet and at the general level of the burner ports. These steam ports direct steam jets across the ascending gaseous products of combustion and at an upward angle. The added steam fully mixes with the combustion products stream as the mixture passes through the restricted gas outlet, so that the desired degree and length of contact between the reactants and the steam is effected in the throat and in the secondary reaction chamber, thus enhancing the efficiency of the gasification process.

A feature of the invention is the burner construction, which is so designed as to thoroughly mix the steam, oxygen and coal without sticking of the coal to heated surfaces. The coal is introduced through a relatively large pipe or conduit having a restricted venturi throat near its exit. The oxygen and steam are brought into the coal pipe through concentric conduits extending through the pipe wall and terminating in flaring nozzles just in advance of the venturi burner throat. The oxygen conduit surrounds the steam conduit, so that heat is imparted to the oxygen and the relatively cool oxygen is interposed between the coal stream and the hot steam conduit. This inhibits sticking of the coal to hot surfaces. The three ingredients are intimately mixed in the venturi throat, and the mixture leaves the throat at a high velocity. A coolant jacket surrounds the discharge end of the coal pipe. The venturi throat of the burner makes it possible to supply coal to the burner at atmospheric pressure for entrainment in the oxygen and steam and delivery from the burner exit even into a zone at super-atmospheric pressure.

For an understanding of the invention principles, reference is made to the following description of a typical embodiment thereof as illustrated in the accompanying drawing.

Figure 1:
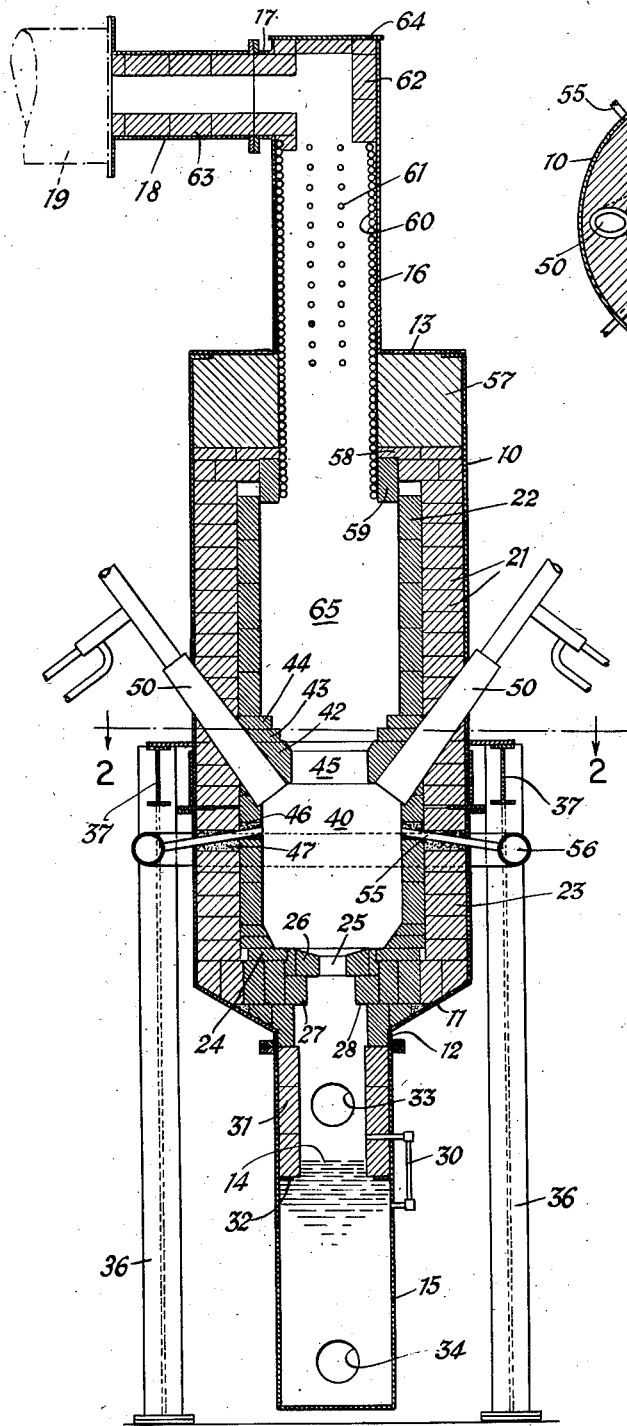
Fig. 1 is an axial sectional view through coal gasification apparatus embodying the invention.
Figure 2:
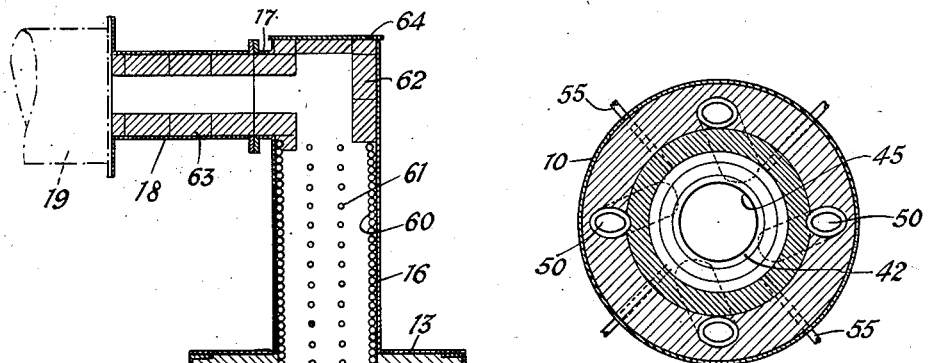
Fig. 2 is a diametric sectional view on the line 2—2 of Fig. 1.

Referring to Fig. 1, the primary combustion and secondary reaction chambers and a portion of the synthesis gas cooling unit are mounted within a substantially cylindrical metal casing 10 having a hopper shaped bottom wall 11 converging to a cylindrical neck 12, the upper end of the casing being closed by a flat annular plate 13. The slag from the slag outlet falls into water 14 contained within a cylindrical extension or ash tank 15 co-axial with casing 10. An upper cylindrical extension 16 is provided for the gas cooling arrangement, and is preferably co-axial with the annular plate 13. Extension 16 has a flange side outlet 17 to which is secured a flanged gas withdrawal pipe 18 connected to a conduit 19 for leading the gas to storage or a point of use.

The inner surface of casing 10 is lined with superposed annular courses of insulating brick 21 for the major portion of its length. The refractory insulating lining 21 is, in turn, lined with annular courses of firebrick indicated at 22 and 23. Firebrick courses 22 and 23 are preferably supported in such manner that they may be easily moved and replaced when the firebrick becomes eroded without disruption of the remainder of the structure. Adjacent hopper bottom 11, the firebrick courses are extended inwardly as indicated at 24 and an annular firebrick ring 26 surrounds the bottom slag outlet 25, ring 26 being substantially supported on firebrick courses 27, 28. The firebrick structure 26, 27, 28 is keyed into the conical bottom structure of shell 10 to allow ash can 15 to be removed without interference with the firebrick structure. The upper portion of the tubular extension 15 is lined with courses of firebrick 31, which are supported on a radial flange 32, and is provided with a water gauge 30 and with openings 33, 34. Opening 33 acts as a gas by-pass to assist in maintaining the slag outlet clear, and opening 34 is used for periodic slag removal from ash can 15.

The casing 10 is supported upon a suitable structure comprising columns 36 and beams 37 which engage structural members 38 secured to the casing. The structural members 38 also support an annular plate 41 extending into the casing and serving as a key to support the upper courses of insulating brick 21 and the firebrick courses defining a restricted gas outlet or throat 45. This independent support for the upper courses is provided for the reason that the lower courses of firebrick are the ones most affected by erosion due to slag, and hence need replacement more often than do the upper courses. By providing the independent support for the upper courses, the lower courses of firebrick may be replaced without disturbing the upper courses.

The throat 45 is formed by an inwardly extended firebrick arch or ring 42 and two courses of firebrick 43, 44, arch 42 being keyed into the insulating lining 21 for support of plate 41. The mixture of pulverized coal, oxygen and steam is delivered to the primary chamber 40 by burners generally indicated at 50 and extending through arch 42. A plurality of burners are provided in circumferentially spaced relation around the periphery of the primary chamber and so oriented as to discharge the fuel streams preferably somewhat tangentially of the primary reaction chamber and downwardly toward the slag outlet 25. It will be noted that burners 50 extend downwardly through arch or ring 42, so that the roof or "umbrella" formed by the arch protects the burners from slag running down the chamber walls and interfering with the burner operation.

Somewhat below the inner ends of burner 50, cast refractory lining sections 46 and 47 are provided which receive steam entry ports 55 supplied from an annular header 56. Ports 55 are spaced circumferentially of the primary reaction chamber, and circumferentially intermediate the burners 50. It will be noted that the steam ports are directed somewhat upwardly. While the ports 55 are shown beneath the burners 50, this is by way of example only. In the general case, the steam entry ports are located in the general zone of the burner mouths and in advance of throat 45, and not necessarily at a level beneath the burner mouths as shown.

Above the uppermost course of bricks 21 and 22, the casing 10 encloses a cast refractory annular member 57 which is co-axial with extension 16. Arch members 58 and 59 form a downward extension of the cylindrical gas outlet, and are supported by suitable means, such as lugs welded to the bottom turn of a coil 60 which lines the internal peripheral surface of casting 57 and arches 58 and 59.

The length of coil 60, the volume of cast refractory 57 and the position of members 58 and 59 is adjustable to vary the volume of chamber 65 for optimum results of the synthesis gas reaction. For example, should a greater chamber volume be indicated, the lower turns of coil 60 may be omitted, the courses 22 and 58 extended upwardly, and cast refractory 57 reduced in length or omitted. Also, the chamber volume can be altered by omitting casting 57 and lowering ring 13 onto courses 58.

The wall coil 60 and an associated tube bank 61 suspended therein are supplied with water so that the steam requirements for the synthesis gas reaction may be provided by absorption of heat from the synthesis gas leaving the secondary reaction chamber 65. The upper end of extension 16 is lined with insulating brick courses 62, and outlet 18 is lined with insulating brick courses 63. A refractory lined plate 64 closes the outer end of extension 16 and may be replaced by an annular ring connected to a suitable relief valve.

Figure 3:
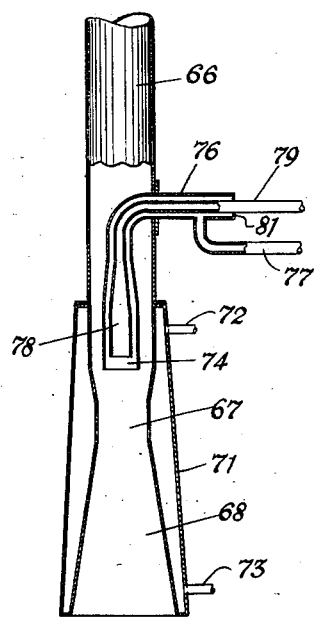
Fig. 3 is an enlarged elevation view, partly in section of an oxygen-steam-pulverized coal burner according to the invention.

A typical construction of burner 50 is illustrated in Fig. 3 as including a coal supply pipe 66 which is generally cylindrical for a major portion of its length. Near its outer end, pipe 66 is reduced in cross section to form venturi exit section having a throat 67 succeeded by an expansion nozzle 68. A coolant jacket 71 surrounds throat 67 and nozzle 68 and has coolant inlet and outlet connections 72, 73.

The oxygen is introduced into pipe 66 immediately in advance of throat 67 by a nozzle 74 formed on the outer end of a conduit having a lateral extension 76 disposed through the wall of pipe 66 and supplied with oxygen from the conduit 77. A second nozzle 78 is disposed within and concentric with nozzle 74, having its outer end inwardly of the outer end of nozzle 74. Nozzle 78 is an extension of a pipe 79 which extends through the end wall 81 of pipe 76. Steam is introduced through the inner pipe 79 and oxygen through the surrounding pipe 76 so that the pulverized coal delivered through pipe 76 is kept from contact with a hot steam pipe by the surrounding realtively cooler oxygen pipe and nozzle.

The steam and oxygen mix, in passing through throat 67, and entrain the pulverized fuel so that the mixture is discharged from the end of nozzle 68. The coal may be delivered to pipe 66 at atmospheric pressure and, due to the action of the venturi exit section, discharged into chamber 40 even against a super-atmospheric chamber pressure.

In the operation of the process, the burners 50 deliver solid fuel (coal) in a pulverized state in suspension in fluid streams of substantially pure oxygen in an amount less than that required for complete combustion of the fuel, and at least a portion of the steam required for the synthesis reaction. As stated, the pulverized fuel is delivered through pipe 66 and entrained in the stream of oxygen leaving nozzle 74 and steam leaving nozzle 78, the entrainment taking place in the restricted throat 67. In a typical example, the steam is at 1400° F., the oxygen at 400° F. The steam and oxygen leaving the nozzles 74 and 78 may have a velocity of 1480 feet per minute. If pipe 66 has an internal diameter of 6" with throat 67 being 5" in diameter and nozzle 68 having an included angle of 20°, the average velocity of the oxygen-steam-coal-stream leaving burners 50 is 8000 feet per minute.

The mixture is ignited in any suitable manner, and the fuel particles are burned while in suspension in fluid streams directed preferably somewhat tangentially of primary combustion chamber 40 and downwardly toward slag outlet 25 to maintain a rate of fuel combustion in the lower part of chamber 40 sufficient to maintain a normal mean chamber temperature, adjacent the slag outlet, above the fuel ash fusion temperature. The fusible portion of the slag thus remains fluid and runs out through slag outlet 25 dropping into the water in tank 15, from which the water and fused slag may be withdrawn in any suitable manner either continually or at periodic intervals. While a somewhat tangentially directed burner arrangement is illustrated by way of example, other burner arrangements may be used. In any case, it is desirable that the fuel streams not impinge on the refractory-lined chamber walls. A typical alternative arrangement is to mushroom the lower end of chamber 40, and direct the burners directly downwardly through the mushroom roof onto the slag covered furnace bottom around slag outlet 25. The streams striking the bottom will be re-directed upwardly through the central part of the chamber.

The resulting stream of gaseous products of combustion and any unburned or partially burned fuel particles rises toward restricted outlet 45. If only a portion of the reaction steam requirements has been introduced through burners 50, just before the ascending stream reaches outlet 45 it receives the remaining portion of the required reaction steam, in intimate mixing relation, from the ports 55, a thorough admixture of the high temperature reactants and the aditional steam being effected in the throat 45. The throat 45, in addition to its mixing function, increases the velocity of the stream passing therethrough to provide a high velocity barrier to recirculation of partially or fully reacted gases into the primary chamber 40 which comprises a preponderantly exothermic reaction zone.

The stream of reactants, at a temperature within or above the optimum reaction range, leaving throat 45 enters the secondary reaction chamber 65 which forms a preponderantly endothermic reaction zone in which the synthesis gas reaction is completed. The synthesis gas is predominately CO—$H_2$, but may have about 15% $CO_2$, about 2% $CH_4$, and a small amount of nitrogen, these proportions and the analyses varying somewhat with the coal analysis and the degree of completeness of the coal gasification.

The throat 45 may be followed by an expansion section, as shown, leading into the secondary chamber 65. Leaving the secondary reaction chamber 65, the synthesis gas is rapidly cooled and stabilized in passing over the wall coil 60 and the suspended tube bank 61 so that the gas passing through outlet 18 into conduit 19 is at a temperature of about 400° F.

The temperature in the primary combustion chamber 40, particularly adjacent slag outlet 25, is maintained above the slag fusion temperature so that the slag remains continuously in a molten state and may be effectively removed, but the overall temperature in the chamber should be maintained below a level which would cause severe damage to the refractory lining. A further requirement is that the temperature of the stream of reactants leaving the primary chamber must be sufficiently above the optimum range so that the reactants will remain within such optimum reaction range a sufficiently long time to assure completion of the reaction. Control of the temperature conditions of the primary zone is facilitated by the two-stage nature of the process in which any portion of the required steam may be supplied with the oxygen and fuel, and any additional required steam be added through the ports 55 in advance of restricted outlet 45. This temperature, furthermore, being thus controlled to a level above the slag fusion temperature, assures that the slag will remain molten until it has been discharged through outlet 25 and thus obviates the necessity for any additional burners or other heating means adjacent the slag outlet and assures continuity of the gas production process without interruption for slag removal.

The invention process not only assures such continuous operation and continuous withdrawal of slag in the molten state, but also effects more complete carbon utilization than existing coal suspension gasification processes. The slag disposition may be further controlled by recirculation of a portion of the exiting gases into the stream entering chamber 65. In addition, the cooling surfaces of coils 60 and 61 serve as collecting surfaces for ash in the gases leaving chamber 65, particularly ashes or slag in the transition stage between fluid and dry ash conditions. Slag accumulations on the cooling surfaces can be removed by any of the methods or means commonly used in steam generation practice. While the apparatus illustrated is designed for operation at atmospheric pressure, it may also be operated at a slight super-atmospheric pressure.

While a specific embodiment of the invention has been shown and described in detail to illustrate the application of the invention principles, it will be understood that the invention may be otherwise embodied without departing from such principles.

We claim:

1. The method of continuously producing a synthesis gas by the reaction at high temperatures of oxygen and steam with a solid fuel containing carbon and ash, which comprises introducing into one end of a laterally confined primary zone solid fuel in a pulverized state in suspension in a fluid stream of substantially pure oxygen in an amount less than that required for complete combustion of the fuel and at least a portion of the steam required for the synthesis reaction; effecting in such primary zone a preponderantly exothermic reaction of the fuel, oxygen, and steam to elevate the temperature level of the reactants to a value within the optimum temperature range for the endothermic reaction of the steam with the products of such preponderantly exothermic reaction and above the fuel ash fusion temperature while the fuel particles are in suspension in a fluid stream directed initially toward a slag outlet at the opposite end of such zone and then reversely toward such one end of such zone; continuously withdrawing the ash released from the fuel during such preponderantly exothermic reaction, as a molten slag through the slag outlet, the fluid stream scrubbing the molten slag flowing toward such outlet to react with any fuel particles entrapped in such molten slag; withdrawing a stream of gaseous products of such preponderantly exothermic reaction, steam, and any unreacted fuel particles from the primary zone through a laterally confined transition zone at such one end of the primary zone having a cross sectional flow area substantially less than that of the primary zone to thoroughly admix the reactants and to increase the velocity of such last-named stream to provide a high velocity barrier preventing reverse flow of the reactants into the primary zone; supplying the remaining portion of the reaction steam to such last-named stream in intimate mixing relation therewith in advance of the transition zone for thorough admixing in the transition zone; and completing the preponderantly endothermic synthesis gas reaction as the stream flows through a confined secondary zone receiving the reactants from such transition zone.

2. The method of continuously producing a synthesis gas by the reaction at high temperatures of oxygen and steam with a solid fuel containing carbon and ash, which comprises introducing into one end of a laterally confined primary zone solid fuel in a pulverized state in suspension in a fluid stream of substantially pure oxygen in an amount less than that required for complete combustion of the fuel and at least a portion of the steam required for the synthesis reaction; effecting in such primary zone a preponderantly exothermic reaction of the fuel, oxygen, and steam to elevate the temperature level of the reactants to a value within the optimum temperature range for the endothermic reaction of the steam with the products of such preponderantly exothermic reaction and above the fuel ash fusion temperature while the fuel particles are in suspension in a fluid stream directed initially toward a slag outlet at the opposite end of such zone and then reversely toward such one end of such zone; continuously withdrawing the ash released from the fuel during such preponderantly exothermic reaction as a molten slag through the slag outlet, the fluid stream scrubbing the molten slag flowing toward such outlet to react with any fuel particles entrapped in such molten slag; withdrawing a stream of gaseous products of such preponderantly exothermic reaction, steam, and any unreacted fuel particles from such primary zone through a laterally confined transition zone at such one end of the primary zone having a cross sectional flow area substantially less than that of the primary zone to thoroughly admix the reactants and to increase the velocity of such last-named stream to provide a high velocity barrier preventing reverse flow of the reactants into the primary zone; supplying the remaining portion of the reaction steam to such last-named stream in intimate mixing relation therewith in advance of the transition zone for thorough admixing in the transition zone; expanding the stream leaving the transition zone into a confined secondary zone to inhibit eddying of the stream in the secondary zone; and completing the preponderantly endothermic synthesis gas reaction as the stream flows through the secondary zone; such expansion preventing flow of fully reacted gas into the stream leaving the transition zone.

3. The method of continuously producing a synthesis gas by the reaction at high temperatures of oxygen and steam with a solid fuel containing carbon and ash, which comprises introducing into one end of a laterally confined primary zone solid fuel in a pulverized state in suspension in a fluid stream of substantially pure oxygen in an amount less than that required for complete combustion of the fuel, and steam; effecting in such primary zone a preponderantly exothermic reaction of the fuel, oxygen, and steam to elevate the temperature level of the reactants to a value within the optimum temperature range for the endothermic reaction of the steam with the products of such preponderantly exothermic reaction and above the fuel ash fusion temperature while the fuel particles are in suspension in a fluid stream directed initially toward a slag outlet at the opposite end of such zone and then reversely toward such one end of such zone; continuously withdrawing the ash released from the fuel during such preponderantly exothermic reaction as a molten slag through the slag outlet, the fluid stream scrubbing the molten slag flowing toward such outlet to react with any fuel particles entrapped in such molten slag; withdrawing a stream of gaseous products of such preponderantly exothermic reaction, steam, and any unreacted fuel particles from the primary zone through a laterally confined transition zone at such one end of the primary zone having a cross sectional flow area substantially less than that of the primary zone to thoroughly admix the reactants and to increase the velocity of such last-named stream to provide a high velocity barrier preventing reverse flow of the reactants into the primary zone; and completing the synthesis gas reaction as the stream flows through a laterally confined secondary zone receiving the stream from such transition zone.

4. Apparatus for continuously producing a synthesis gas by the reaction at high temperatures of oxygen and steam with a solid fuel containing carbon and ash, comprising, in combination, a primary combustion chamber; mixer means connected to sources of fuel, oxygen and steam, for introducing into said chamber adjacent one end thereof solid fuel in a pulverized state in suspension in a fluid stream of substantially pure oxygen, in an amount less than that required for complete combustion of the fuel, and steam for incomplete burning of the suspended fuel particles to elevate the temperature level of the reactants to a value within the optimum range for endothermic reaction of the steam with the products of such combustion, said mixer means directing the fluid stream initially toward the opposite end of said chamber; said chamber having a slag outlet at its opposite end; said chamber having a restricted gas outlet at such one end for withdrawing a stream of the high temperature reactants and any unburned fuel particles from the chamber, and effecting thorough admixing of the reactants and an increase in the velocity of the stream therethrough to provide a high velocity barrier inhibiting reverse flow of the reactants into said combustion chamber; and a secondary reaction chamber in communication with said gas outlet to receive the stream of reactants and any unburned fuel particles therefrom for completion of the synthesis gas reaction.

5. Apparatus for continuously producing a synthesis gas by the reaction at high temperatures of oxygen and steam with a solid fuel containing carbon and ash, comprising, in combination, a primary reaction chamber having a bottom slag withdrawal outlet; means for introducing into said chamber adjacent the top end thereof solid fuel in a pulverized state in suspension in a fluid stream of substantially pure oxygen in an amount less than that required for complete combustion of the fuel, and steam, said means directing the fuel stream downwardly into the chamber toward said outlet for incomplete burning of the suspended fuel particles to elevate the temperature level of the reactants to a value within the optimum range for endothermic reaction of the steam with the products of such combustion and above the fuel ash fusion temperature; said chamber having a restricted gas outlet at its top end for withdrawing a stream of the high temperature reactants and any unburned fuel particles from the chamber, and effecting thorough admixing of the reactants and an increase in the velocity of the stream therethrough to provide a high velocity barrier inhibiting reverse flow of the reactants into said combustion chamber; and a secondary reaction chamber in communication with said gas outlet to receive the stream of reactants and any unburned fuel particles therefrom for completion of the synthesis gas reaction.

6. Apparatus for continuously producing a synthesis gas by the reaction at high temperatures of oxygen and steam with a solid fuel containing carbon and ash, comprising in combination, an upright cylindrical refractory-faced combustion chamber having a bottom slag withdrawal outlet and a frusto-conical roof defining a restricted gas outlet; a plurality of burners extending into said chamber through said roof at circumferentially spaced points and each directed downwardly toward the slag outlet and each being constructed and arranged to deliver to the chamber solid fuel in a pulverized state in suspension in a fluid stream of oxygen in an amount less than that required for complete combustion of the fuel and steam, for incomplete burning of the suspended fuel particles to elevate the temperature level of the reactants to a value within the optimum range for endothermic reaction of the steam with the products of such combustion and above the fuel ash fusion temperature; said restricted gas outlet serving for withdrawing a stream of the high temperature reactants and any unburned fuel particles from the chamber, and effecting thorough admixing of the reactants and an increase in the velocity of the stream therethrough to provide a high velocity barrier inhibiting reverse flow of the reactants into said combustion chamber; and a secondary reaction chamber in communication with said gas outlet to receive the stream of reactants and any unburned fuel particles therefrom for completion of the synthesis gas reaction.

7. The method of continuously producing a synthesis gas by the reaction at high temperatures of oxygen and steam with a solid fuel containing carbon, which comprises introducing into and adjacent one end of a laterally confined primary zone solid fuel in a pulverized state in suspension in a fluid stream of substantially pure oxygen in an amount less than that required for complete combustion of the fuel, and steam; effecting in such primary zone a preponderantly exothermic reaction of the fuel, oxygen, and steam to elevate the temperature level of the reactants to a value within the optimum temperature range for the endothermic reaction of the steam with the products of such preponderantly exothermic reaction and above the fuel ash fusion temperature while the fuel particles are in suspension in a fluid stream directed initially toward a slag outlet at the opposite end of such zone and then reversely toward such one end of such zone; continuously withdrawing the ash, released from the fuel during such preponderantly exothermic reaction, as a molten slag through the slag outlet, the fluid stream scrubbing the molten slag flowing toward such outlet to react with any fuel particles entrapped in such molten slag; continuously withdrawing a stream of gaseous products of such preponderantly exothermic reaction, steam, and any unreacted fuel particles from such primary zone through such one end of the primary zone; and completing the preponderantly endothermic synthesis gas reaction as the stream flows through a laterally confined secondary zone receiving the reactants from such one end of the primary zone.

8. The method of continuously producing a synthesis gas by the reaction at high temperatures of oxygen and steam with a solid fuel containing carbon, which comprises introducing into and adjacent one end of a laterally confined primary zone and in a direction toward the opposite end of the zone solid fuel in a pulverized state in suspension in a fluid stream of substantially pure oxygen in an amount less than that required for complete combustion of the fuel, and steam; effecting in such primary zone a preponderantly exothermic reaction of the fuel, oxygen, and steam to elevate the temperature level of the reactants to a value within the optimum temperature range for the endothermic reaction of the steam with the products of such preponderantly exothermic reaction and above the fuel ash fusion temperature while the fuel particles are in suspension in a fluid stream directed initially toward a slag outlet at the opposite end of such zone and then reversely toward such one end of such zone; continuously withdrawing the ash, released from the fuel during such preponderantly exothermic reaction, as a molten slag through the slag outlet, the fluid stream scrubbing the molten slag flowing toward such outlet to react with any fuel particles entrapped in such molten slag; continuously withdrawing a stream of gaseous products of such preponderantly exothermic reaction, steam, and any unreacted fuel particles from such primary zone through such one end of the primary zone; and completing the preponderantly endothermic synthesis gas reaction as the stream flows through a laterally confined secondary zone receiving the reactants from such one end of the primary zone.

9. The method of continuously producing a synthesis gas by the reaction at high temperatures of oxygen and steam with a solid fuel containing carbon, which comprises introducing into and adjacent one end of a laterally confined primary zone and in a direction toward the opposite end of the zone solid fuel in a pulverized state in suspension in a fluid stream of substantially pure oxygen in an amount less than that required for complete combustion of the fuel, and steam; effecting in such primary zone a preponderantly exothermic reaction of the fuel, oxygen, and steam to elevate the temperature level of the reactants to a value within the optimum temperature range for the endothermic reaction of the steam with the products of such preponderantly exothermic reaction and above the fuel ash fusion temperature while the fuel particles are in suspension in a fluid stream directed initially toward a slag outlet at the opposite end of such zone and then reversely toward such one end of such zone; continuously withdrawing the ash, released from the fuel during such preponderantly exothermic reaction, as a molten slag through the slag outlet, the fluid stream scrubbing the molten slag flowing toward such outlet to react with any fuel particles entrapped in such molten slag; continuously withdrawing a stream of gaseous products of such preponderantly exothermic reaction, steam, and any unreacted fuel particles from such primary zone through such one end of the primary zone; and completing the preponderantly endothermic synthesis gas reaction as the stream flows through a laterally confined secondary zone receiving the reactants from such one end of the primary zone.

10. The method of continuously producing a synthesis gas by the reaction at high temperatures of oxygen and steam with a solid fuel containing carbon, which comprises introducing into and adjacent one end of a laterally confined relatively elongated primary zone a mixture of solid fuel in a pulverized state in suspension in a fluid stream of substantially pure oxygen in an amount less than that required for complete combustion of the fuel, and steam; effecting in such primary zone a preponderantly exothermic reaction of the fuel, oxygen, and steam to elevate the temperature level of the reactants to a value within the optimum temperature range for the endothermic reaction of the steam with the products of such preponderantly exothermic reaction and above the fuel ash fusion temperature while the fuel particles are in suspension in a fluid stream directed initially toward a slag outlet at the opposite end of such zone and then reversely toward such one end of such zone; and completing the preponderantly endothermic synthesis gas reaction as the stream flows through a laterally confined secondary zone receiving the reactants from such one end of the primary zone.

11. The method of continuously producing a synthesis gas by the reaction at high temperatures of oxygen and steam with a solid fuel containing carbon, which comprises introducing into and adjacent one end of a laterally confined relatively elongated primary zone a mixture of and in a direction toward the opposite end of the zone solid fuel in a pulverized state in suspension in a fluid stream of substantially pure oxygen in an amount less than that required for complete combustion of the fuel, and steam; effecting in such primary zone a preponderantly exothermic reaction of the fuel, oxygen, and steam to elevate the temperature level of the reactants to a value within the optimum temperature range for the endothermic reaction of the steam with the products of such preponderantly exothermic reaction and above the fuel ash fusion temperature while the fuel particles are in suspension in a fluid stream directed initially toward a slag outlet at the opposite end of such zone and then reversely toward such one end of such zone; and completing the preponderantly endothermic synthesis gas reaction as the stream flows through a laterally confined secondary zone receiving the reactants from such one end of the primary zone.

12. The method of continuously producing a synthesis gas by the reaction at high temperatures of oxygen and steam with a solid fuel containing carbon, which comprises introducing into and adjacent one end of a laterally confined primary zone and in a direction toward the opposite end of the zone solid fuel in a pulverized state in suspension in a fluid stream of substantially pure oxygen in an amount less than that required for complete combustion of the fuel, and steam; effecting in such primary zone a preponderantly exothermic reaction of the fuel, oxygen, and steam to elevate the temperature level of the reactants to a value within the optimum temperature range for the endothermic reaction of the steam with the products of such preponderantly exothermic reaction and above the fuel ash fusion temperature while the fuel particles are in suspension in a fluid stream directed initially toward a slag outlet at the opposite end of such zone and then reversely toward such one end of such zone; continuously withdrawing the ash, released from the fuel during such preponderantly exothermic reaction, as a molten slag through the slag outlet, the fluid stream scrubbing the molten slag flowing toward such outlet to react with any fuel particles entrapped in such molten slag; and completing the preponderantly endothermic synthesis gas reaction as the stream flows through a laterally confined secondary zone receiving the reactants from such one end of the primary zone.

13. Apparatus for continuously producing a synthesis gas by the reaction at high temperatures of oxygen and steam with a solid fuel containing carbon and ash, comprising, in combination, a primary combustion chamber; mixer means, connected to sources of fuel, oxygen and steam, constructed and arranged to introduce into said chamber adjacent one end thereof solid fuel in a pulverized state in suspension in a fluid stream of substantially pure oxygen in an amount less than that required for complete combustion of the fuel, and steam for incomplete burning of the suspended particles to elevate the temperature level of the reactants to a value within the optimum range for endothermic reaction of the steam with the products of such combustion said mixer means directing the fluid stream initially toward the opposite end of said chamber; said chamber having a slag outlet at its opposite end; said chamber having a gas outlet at such one end adjacent said mixer means, for withdrawing a stream of the high temperature reactants and any unburned fuel particles from the chamber; and a secondary reaction chamber in communication with said gas outlet to receive the stream of reactants and any unburned fuel particles therefrom for completion of the synthesis gas reaction.

14. Apparatus for continuously producing a synthesis gas by the reaction at high temperatures of oxygen and steam with a solid fuel containing carbon and ash, comprising in combination, an upright cylindrical refractory-faced combustion chamber having a bottom slag withdrawal outlet; a plurality of burners, connected to sources of fuel, oxygen and steam, extending into the upper end of said chamber at circumferentially spaced points and each directed downwardly toward the slag outlet, and each being constructed and arranged to deliver to the chamber solid fuel in a pulverized state in suspension in a fluid stream of oxygen in an amount less than that required for complete combustion of the fuel, and steam, for incomplete burning of the suspended fuel particles to elevate the temperature level of the reactants to a value within the optimum range for endothermic reaction of the steam with the products of such combustion and above the fuel ash fusion temperature; a gas outlet adjacent and just above the delivery ends of said burners, serving for withdrawing a stream of the high temperature reactants and any unburned fuel particles from the chamber; and a secondary reaction chamber in communication with said gas outlet to receive the stream of reactants and any unburned fuel particles therefrom for completion of the synthesis gas reaction.

15. The method of continuously producing a synthesis gas by the reaction at high temperatures of oxygen and steam with a solid fuel containing carbon and ash, which comprises introducing into one end of a laterally confined primary zone solid fuel in a pulverized state in suspension in a fluid stream of oxygen in an amount less than that required for complete combustion of the fuel, and steam; effecting in such primary zone a preponderantly exothermic reaction of the fuel, oxygen, and steam to elevate the temperature range for the endothermic reaction of the steam with the products of such preponderantly exothermic reaction and above the fuel ash fusion temperature while the fuel particles are in suspension in a fluid stream directed initially toward a slag outlet at the opposite end of such zone and then reversely toward such one end of such zone; continuously withdrawing the ash, released from the fuel during such preponderantly exothermic reaction, as a molten slag through the slag outlet, the fluid stream scrubbing the molten slag flowing toward such outlet to react with any fuel particles entrapped in such molten slag; withdrawing a stream of gaseous products of such preponderantly exothermic reaction, steam and any unreacted fuel particles from the primary zone through a laterally confined transition zone at such one end of the primary zone having a cross sectional flow area substantially less than that of the primary zone to thoroughly admix the reactants and to increase the velocity of such last-named stream to provide a high velocity barrier preventing reverse flow of the reactants into the primary zone; and completing the synthesis gas reaction as the stream flows through a laterally confined secondary zone receiving the stream from such transition zone.

16. The method of continuously producing a synthesis gas by the reaction at high temperatures of oxygen and steam with a solid fuel containing carbon, which comprises introducing into and adjacent one end of a laterally confined primary zone solid fuel in a pulverized state in suspension in a fluid stream of oxygen in an amount less than that required for complete combustion of the fuel, and steam; effecting in such primary zone a preponderantly exothermic reaction of the fuel, oxygen, and steam to elevate the temperature level of the reactants to a value within the optimum temperature range for the endothermic reaction of the steam with the products of such preponderantly exothermic reaction and above the fuel ash fusion temperature while the fuel particles are in suspension in a fluid stream directed initially toward a slag outlet at the opposite end of such zone and then reversely toward such one end of such zone; continuously withdrawing the ash, released from the fuel during such preponderantly exothermic reaction, as a molten slag through the slag outlet, the fluid stream scrubbing the molten slag flowing toward such outlet to react with any fuel particles entrapped in such molten slag; continuously withdrawing a stream of gaseous products of such preponderantly exothermic reaction, steam, and any unreacted fuel particles from such primary zone through such one end of the primary zone; and completing the preponderantly endothermic synthesis gas reaction as the stream flows through a laterally confined secondary zone receiving the reactants from such one end of the primary zone.

References Cited in the file of this patent

UNITED STATES PATENTS

| | | |
|---|---|---|
| 901,232 | Eldred | Oct. 13, 1908 |
| 1,083,683 | Hirt | Jan. 6, 1914 |
| 1,098,534 | Servais | June 2, 1914 |
| 1,110,782 | Hirt | Sept. 15, 1914 |
| 1,114,355 | Hirt | Oct. 20, 1914 |
| 1,258,654 | Cram | Mar. 12, 1918 |
| 1,913,968 | Winkler | June 13, 1933 |
| 2,516,141 | Newman et al. | July 25, 1950 |
| 2,558,746 | Gaucher | July 3, 1951 |
| 2,677,603 | Van Loon | May 4, 1954 |
| 2,699,384 | Perry et al. | Jan. 11, 1955 |
| 2,716,598 | Moses | Aug. 30, 1955 |